April 24, 1951     B. CARLIN     2,549,891
SUPERSONIC TESTING
Filed Dec. 21, 1945
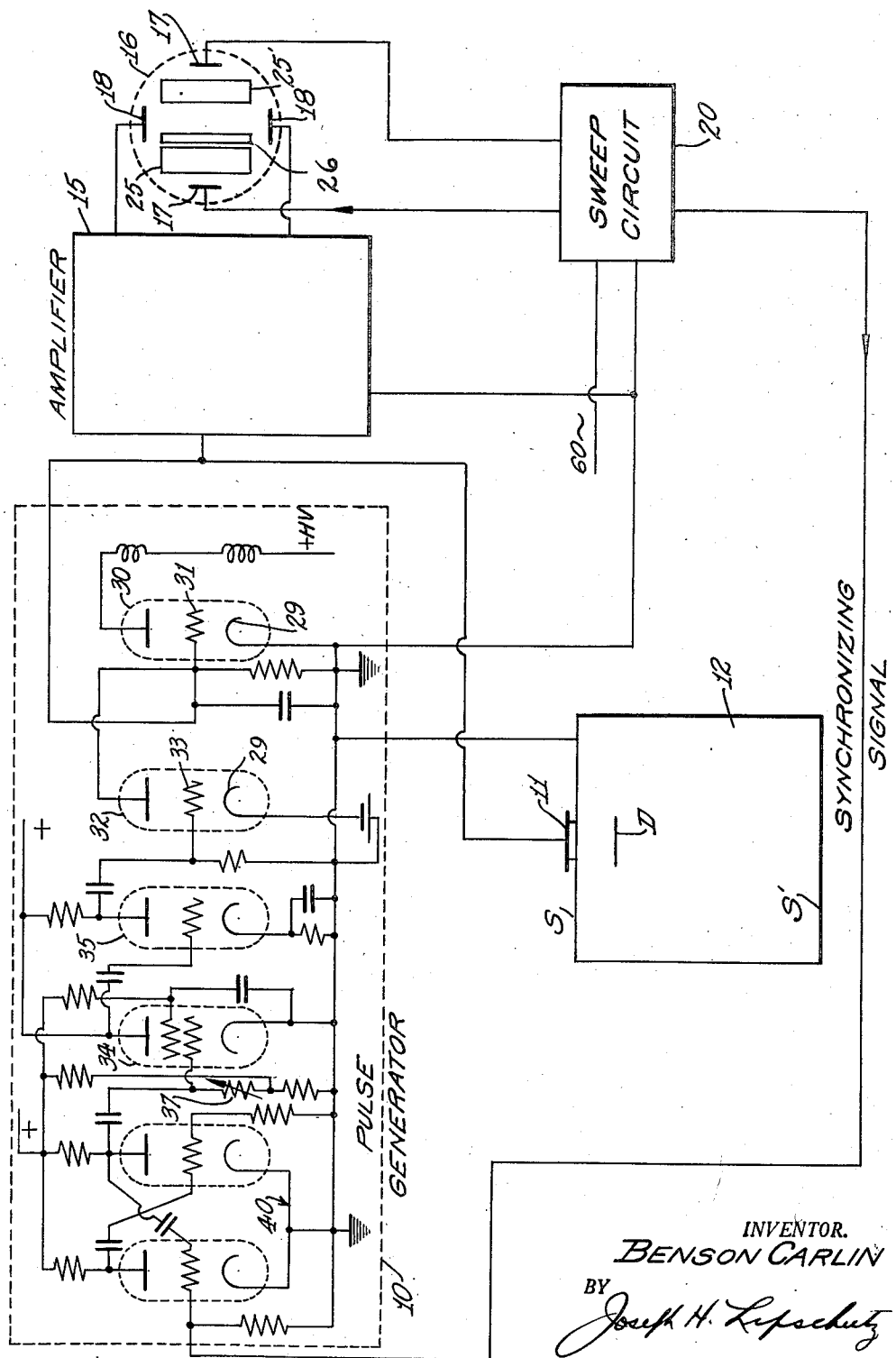
INVENTOR.
BENSON CARLIN
BY
Joseph H. Lipschutz
ATTORNEY Patented Apr. 24, 1951

2,549,891

UNITED STATES PATENT OFFICE 2,549,891

SUPERSONIC TESTING

Benson Carlin, New York, N. Y., assignor to Sperry Products, Inc., Hoboken, N. J., a corporation of New York Application December 21, 1945, Serial No. 636,475

2 Claims. (Cl. 73—67)

This invention relates to supersonic testing of materials wherein wave trains or pulses of high frequency sound waves are designed to be transmitted into an article, and either the time between transmission and reflection of the pulse, or the amount of energy of the pulse coming out of the article is indicated on a suitable indicator. One such method of testing is disclosed in the patent to F. A. Firestone No. 2,280,226, granted April 21, 1942, which discloses the method of sending wave trains into an article under test and measuring the time interval which elapses between the sending of the signal and receiving of the reflection from defects within the article. The transmitted pulses may be applied to the article by a piezo-electric element such as a crystal and the reflected pulse may be received either by the same crystal or another crystal, and the output of the crystal may be impressed on the input of an amplifier. In systems such as outlined above, the frequency of vibration of the crystal bears a definite relation to the type and size of defect within the article which it is sought to detect. Therefore, crystals of various frequencies are employed usually ranging upward from 1 megacycle. Heretofore, such practice meant that with each change to a crystal of different frequency the oscillator of the pulse generator had to have its frequency adjusted to match the frequency of the respective crystal. For this purpose the oscillator comprised a tuned circuit consisting of inductance and capacity which could be varied to vary the frequency output of the oscillator. Each change to a crystal of different frequency, therefore, necessitated several adjustments to tune the oscillator circuit to the frequency of the new crystal.

It is one of the principal objects of this invention to provide a supersonic testing system wherein a change to a crystal of different natural frequency will not necessitate adjustments of the pulse generator circuit.

It is a further object of this invention to provide a system wherein a change to a crystal of different natural frequency will automatically effect tuning of the oscillator circuit to the proper frequency.

It is a further object of this invention to provide in a testing system as outlined above an arrangement whereby the system will be self-tuning in response to change of crystal to different natural crystal frequency.

Further objects and advantages of this invention will become apparent in the following detailed description thereof.

In the accompanying drawing, the single view is an electric wiring diagram showing one embodiment of this invention.

Referring to the drawing, it will be seen that I have provided a suitable pulse generator 10 for generating wave trains or pulses periodically. This pulse generator may be of the type disclosed in my co-pending application, Serial No. 624,824, filed October 26, 1945, which is now abandoned. Each pulse or wave train as it is generated is impressed upon a crystal 11 which is in engagement with workpiece 12 which it is desired to test for defects. The pulse will cause the crystal 11 to oscillate and send a wave train of mechanical vibrations through the workpiece 12 from the upper or entering surface S through the block to the lower or reflecting surface S'. At the same time that the pulse is impressed on the crystal 11, it is also impressed on an amplifier 15 whose output may actuate any suitable indicator. As shown in the drawing, this indicator is an oscilloscope 16 having horizontal plates 17 and vertical plates 18. Across the horizontal plates 17 there may be impressed a sweep by a conventional sweep circuit 20 energized from any suitable source of alternating current such as a 60 cycle source so that 60 times each second a sweep will be started across the oscilloscope between plates 17. Preferably the sweep and pulse are synchronized either by a synchronizing signal from the sweep controlling the pulse generator or the generated pulse controlling the sweep. Such systems are well known and may be, for example, as shown in the co-pending patent application of F. A. Firestone, Serial No. 602,098, filed June 28, 1945.

The generated pulse which is impressed on the crystal 11 also actuates the indicator 16 where the output of the amplifier 15 impressed across plates 18 will cause a periodic vertical displacement of the sweep to generate a pulse shown diagrammatically at 25. As the pulse travels through the workpiece 12 and strikes the surface S' it is reflected back to the crystal 11 where the mechanical vibrations generate voltages which are impressed on the amplifier whose output acting on plates 18 will cause an indication 25' on the sweep. The distance between 25 and 25' is a measurement of time which the pulse consumed in travelling through the workpiece and back to the crystal and it is, therefore, a measurement of distance since it corresponds to twice the depth of the workpiece. Should the pulse strike an intermediate reflecting surface such as the fissure D, some of the pulse will be reflected by this surface to the crystal. This will become evident by an indication 26 on the oscilloscope. The distance from the beginning of indication 26 to the beginning of pulse 25 is a function of the depth of the defect below the surface S.

The crystal 11 is chosen of a frequency which bears a definite relation to the size and form of the particular type of defect which it is desired to detect. Thus, the smaller the defect which one desires to detect, the shorter must be the wave length and, therefore, the higher must be the frequency of the crystal 11. In testing various articles or in looking for different types of defect within the same article, it becomes necessary, therefore, to change the crystal to one having the required frequency. Thus, it has been common to employ a series of crystals with frequencies ranging upward from 1 megacycle. Each such change of crystal requires a multiplicity of changes in the pulse generator and the receiver, as stated in the introduction hereto, because it is necessary to generate wave trains of the respective frequencies. By this invention, however, all such adjustments in the pulse generator are avoided and I accomplish these highly desirable results by the following method and means.

The pulse generator may be of the type disclosed in my aforementioned co-pending application, Serial No. 624,824, filed October 26, 1945, and may include an oscillatory circuit having an oscillator tube 30 upon whose control grid 31 there is normally placed a relatively large negative bias by a trigger tube 32 which is normally conductive. The cathode 29 of the trigger tube has a large negative voltage thereon so that, while the tube is conductive, it will place a large negative bias on the grid of the oscillator tube. To transmit a pulse, a square wave generator 40 is shown, and the square wave, after passing through an amplifier tube 34 and an inverter tube 35, is designed to place a bias on the grid 33 of the trigger tube 32 sufficient to render the trigger tube non-conductive, thus reducing the negative bias on the grid of the oscillator tube and allowing the oscillator to produce the desired pulse. The duration of the pulse is a function of the length of the square wave which can be adjusted at will by the variable potentiometer 37.

Heretofore, the oscillator included a tuned circuit comprising an inductance coil and a condenser and this circuit was made variable so that the frequency of oscillation of the oscillator could be varied to produce any one of a multiplicity of frequencies to match the frequency of the particular crystal 11 employed at the time. Thus, when a different crystal having a different natural frequency was substituted, it was necessary to retune the tuned circuit of the oscillator to produce the natural frequency of the respective crystal. By my invention, I avoid the necessity for such adjustment by reason of the following arrangement. Instead of providing a tuned circuit in the form of an inductance coil and a condenser in the plate-grid circuit of the oscillator tube 30, I omit these elements and rely upon the crystal 11 in the said plate-grid circuit to provide the tuned circuit. This can be effected by reason of the fact that the crystal 11 is in itself a resonant circuit. Moreover, the mere insertion of the crystal in the circuit automatically tunes the oscillator to the crystal frequency, because the crystal itself is the tuned circuit. Therefore, the adjustments which have heretofore been necessary in the separate tuned circuit consisting of the induction coil and condenser are unnecessary and the system is automatically self-adjusting to deliver the proper pulse frequency to the respective crystal.

The foregoing description of the invention is merely illustrative and changes may be made within the scope of the appended claims.

Having described my invention, what I claim and desire to secure by Letters Patent is:

1. In a device for supersonic testing of an article, said device comprising a pulse generator including an oscillator, means for receiving the pulse and means for indicating the received pulse, the improvement which consists in said oscillator having an oscillatory circuit comprising a resonant component, said component consisting of a piezo-electric element of any desired frequency, the coupling in said element being solely electrical, whereby the oscillator is automatically tuned to the frequency of the element when an element is connected in the oscillatory circuit, said element being adapted to transmit the pulse into the article.

2. In a device for supersonic testing of an article, said device comprising a pulse generator including an oscillator, means for receiving the pulse and means for indicating the received pulse, the improvement which consists in said oscillator comprising an oscillatory circuit including an oscillator tube and a resonant component, said component consisting of a piezo-electric element of any desired frequency, the coupling in said element being solely electrical, whereby the oscillator is automatically tuned to the frequency of the element when an element is connected to the tube in said circuit, said element being adapted to transmit the pulse into the article.

BENSON CARLIN.

REFERENCES CITED

The following references are of record in the file of this patent:

UNITED STATES PATENTS

| Number | Name | Date |
| --- | --- | --- |
| 1,693,806 | Cady | Dec. 4, 1928 |
| 2,280,226 | Firestone | Apr. 21, 1942 |

FOREIGN PATENTS

| Number | Country | Date |
| --- | --- | --- |
| 232,929 | Switzerland | Sept. 16, 1944 |